Sept. 9, 1941.  L. A. THOMPSON  2,255,339
CLAMP FOR TELEPHOTO RECEIVERS
Filed July 22, 1940  2 Sheets-Sheet 1
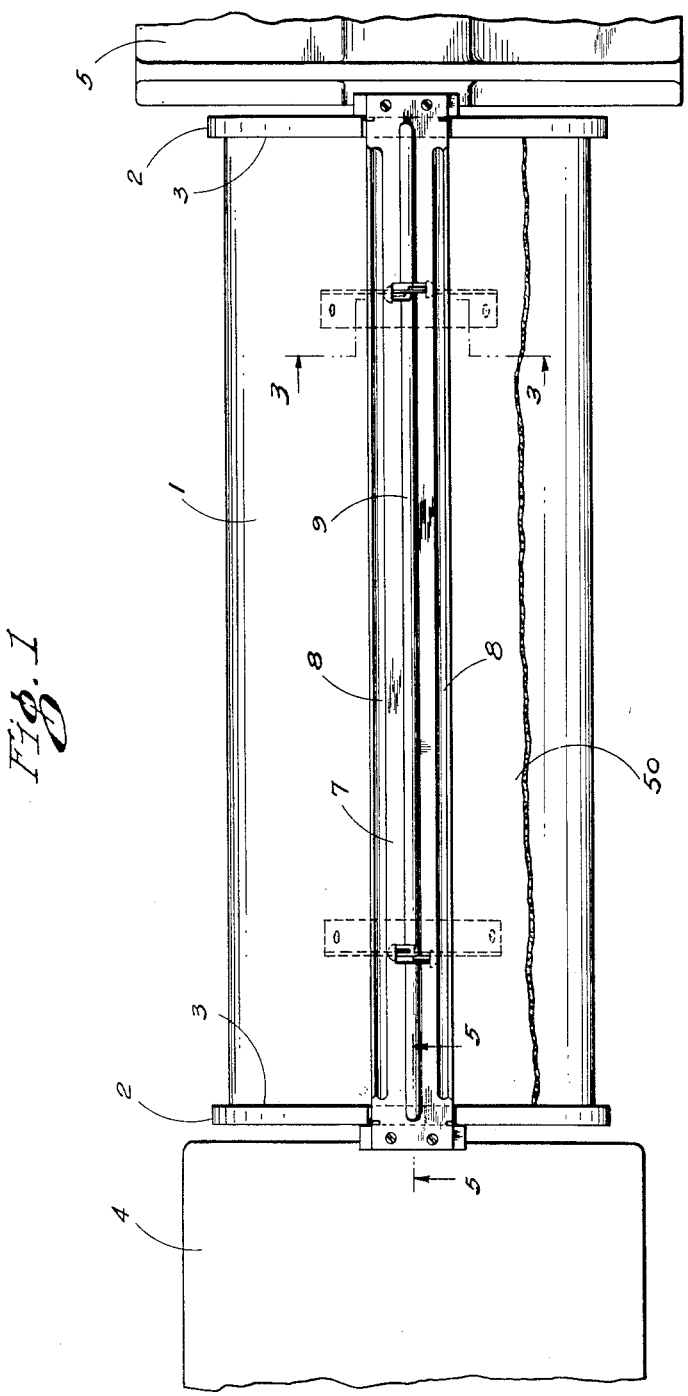
INVENTOR.
LOUIS A. THOMPSON
BY Richey & Watts.
ATTORNEYS.

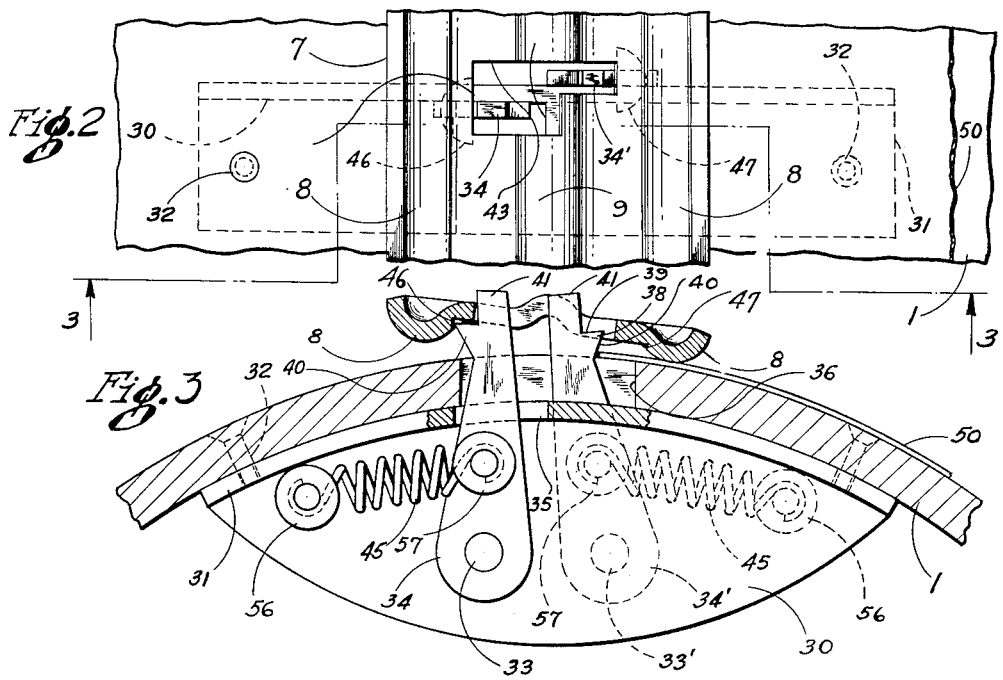
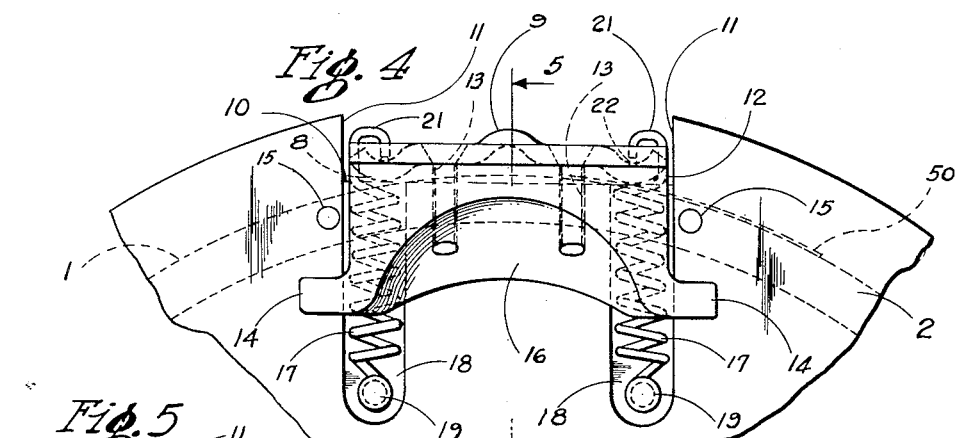
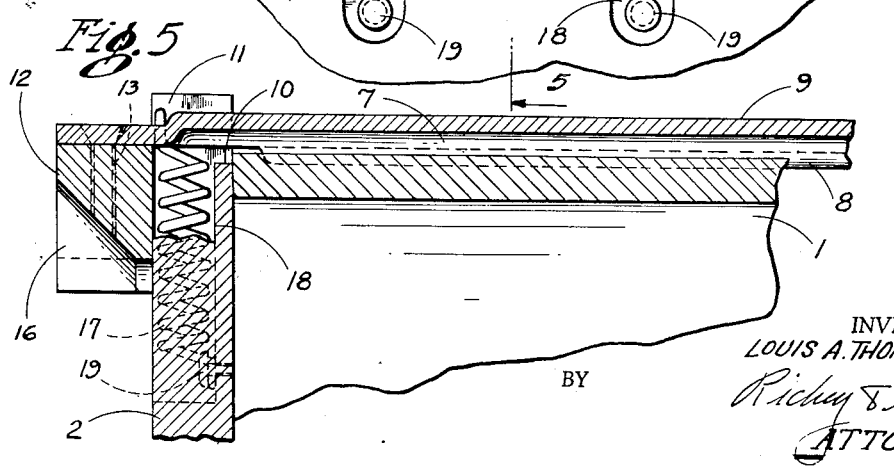

Patented Sept. 9, 1941

2,255,339

UNITED STATES PATENT OFFICE 2,255,339

CLAMP FOR TELEPHOTO RECEIVERS

Louis A. Thompson, Lakewood, Ohio, assignor to Acme Newspictures, Inc., New York, N. Y., a corporation of Delaware Application July 22, 1940, Serial No. 346,704

8 Claims. (Cl. 178—13)

This invention relates to improvements in picture transmitters, and more particularly to an improved mechanism for securing the picture or sensitized film to the drum of a transmitter or receiver.

Heretofore various expedients have been used for securing pictures or the sensitized film to the drum in a receiver or transmitter. As those versed in the art are aware, the transmitter and/or receiver usually has a cylindrical drum which is rotatable at a predetermined speed. The picture to be transmitted, usually in the form of a positive print, is wrapped around the drum and secured in place by suitable holding means. The transmitter drum rotates at a predetermined speed, usually in synchronism with the drums at the receivers, and the picture is scanned by a scanning means which scans the picture continuously moving gradually from one end of the cylinder to the other as the cylinder rotates. It is also proposed to have the scanning means stationary, and rotate the drum and move it longitudinally simultaneously in front of the scanning means.

Various expedients have been provided for securing the picture on a drum. These prior devices have, however, had many discrepancies, among which may be mentioned that they did not hold the picture securely; and mainly in the prior devices it was difficult to secure the picture in place. Although the securing of a picture to be transmitted may not be so complicated because in this instance the operator had plenty of light to see what he was doing, when the sensitized and unexposed film was secured to the drum, this presented a difficult problem since the sensitized sheet of film and emulsion had to be secured on the drum in subdued light or total darkness. This made it somewhat difficult to operate some of the previous mechanisms. Furthermore, some of the other devices had to have special tools for operating the mechanisms.

By the present invention I have provided a means for securing a picture or film on the drum adaptable to varied differences in thickness of the pictures or sensitized material, which means is quickly and easily operated, requires no tools to operate the same, and whereby the operation of securing the picture to the drum was extremely simple, it being possible to accomplish the attaching of the picture in complete darkness if necessary.

In the accompanying drawings I have illustrated an embodiment of the invention wherein:

Fig. 1 is a full size top plan view of a drum for a telephoto receiver;

Fig. 2 is an enlarged fragmentary plan view through a drum and clamping bar;

Fig. 3 is an enlarged section taken from a plane represented by the line 3—3 of Fig. 2 looking in the direction of the arrows;

Fig. 4 is an enlarged fragmentary end elevation of the drum and clamping bar; and Fig. 5 is an enlarged fragmentary section taken on the line 5—5 of Fig. 4.

Briefly, the invention includes a clamping bar secured to and rotatable with the drum, which bar is attached to the drum resiliently by springs. The clamping bar is adapted to be raised to a position spaced from the surface of the drum and held in that position by latches which are urged in locking engagement with the clamping bar to hold the same away from the drum by springs. A sheet of film or picture is adapted to be slid under the clamping bar where the edge of the film engages the latches and releases them from locking engagement, causing the bar to descend and clamp the same securely between the bar and drum. One edge of the film having been secured, the film is wrapped around the drum and the other edge is inserted under the other side of the clamping bar where it engages the latch and releases the same in a similar manner to lock the picture or film securely in place.

More particularly, as best shown in Fig. 1, there is illustrated a hollow cylindrical drum which is provided at its ends with heads or end bells 2 which extend beyond the surface of the drum to provide flanges 3. The end bells are secured to the drum concentrically in any desirable manner. At the left of the drum, as viewed in Fig. 1, there is illustrated at 4, a housing for a motor or gear box from which a shaft, not shown, extends and connects to the end bell of the drum, the shaft being hidden by the clamping bar. The other end of the drum is supported in a bracket 5, suitable bearings being provided.

The clamping bar is illustrated at 7 and may comprise a sheet metal member which extends longitudinally across the surface of the drum being provided with ribs 8 adjacent its opposite longitudinal edges, the bights of which are on the underside and adapted to engage the film or paper.

A reinforcing rib 9 is provided extending longitudinally along the center of the clamping bar for stiffening purposes.

The end bells 2 are each provided with a notch 10 having parallel sides 11 and extending from the edge below the surface of the drum. The clamping bar extends through these notches overhanging the ends of the drum.

Guiding and lifting members are provided on the ends of the clamping bar as best shown in Figs. 1, 4, and 5, each comprising substantially rectangular blocks 12 secured on the underside of the clamping bar by screws 13 which extend through the top of the clamping bar into the blocks. The bar is sufficiently narrow to provide a loose sliding tolerance with the parallel walls 11 of the notch, and the block is secured to the end of the bar which extends beyond the end bells. Each block is provided with lateral extensions 14 at the lower ends which are adapted to engage with pins 15 inserted in the end bells adjacent the notch 10 and spaced from the periphery of the end bells. The pins 15 serve as stops to limit the upward movement of the clamping bar as will hereinafter more clearly appear. Each block is provided with a semi-spherical recess 16 extending from its lower edge upward, as best shown in Figs. 4 and 5, which provides a finger grip and eliminates any sharp edges.

Means for holding the bar resiliently in contact with the surface of the drum is provided and comprises pairs of springs 17 which are disposed in parallel channels 18 formed in the end bells and which open upwardly into the notch 10. The ends of the springs are secured by rivets 19 in the lower ends of the channels and the upper ends of the springs are provided with hooks 21 which extend around the curved edges of the bar and thence downwardly into holes 22 formed through the bar.

It will thus be seen that the bar may be lifted against the pressure of the springs 17, the distance of the lift being limited by the contact of the lugs 14 with the stops 15. The blocks 12 which slide on the outer surface of the end bell, guide and prevent longitudinal movement of the clamping bar relative to the drum.

Latch means is provided for holding the bar in its lifted position, to permit insertion of the picture or film, which latch means may be released either by insertion of the paper under the bar, or manually by engagement with the fingers. To this end there is provided spaced from the end bells and under the clamping bar, as well as inside of the drums, brackets 30 of generally elliptical formation which are provided with laterally extending semi-cylindrical flanges 31 contoured to fit the inner surface of the drum. The brackets are secured to the inner surface of the drum by screws or rivets 32 which extend through the drums into the brackets. Pairs of latches 34 and 34' are secured to each bracket at 33 and 33'. The latch 34 is disposed on the near side of the bracket as viewed in Fig. 3, and extends upwardly through a small rectangular opening 35 in the bracket attaching flange and through a larger rectangular opening 36 in the drum. The latch 34' is secured on the far side of the bracket and also extends up through the opening 36 in the drum. Both latches extend beyond the surface of the drum and are provided with lugs 38 having an upper bar locking surface 39 extending substantially normal to the center line of the latch and a lower slanting cam surface 40. Extensions 41 are provided on the ends of the latches which extend, at all times, above the surface of the clamp bar. The clamping bar is provided with openings 43 substantially L-shaped and through which the latches extend.

Means for moving the latches away from each other and into engagement with the ends of the opening 43 is provided and comprises springs 45 each having one end secured by a rivet 56 to the bracket 30 and the other end by a similar rivet 57 to a mid-point on the latches.

The under-surface of the bar adjacent the openings 36 are milled, as indicated at 46 and 47, to provide a flat surface for engagement with the surfaces 39 of the lugs 38 on the latches.

When the bar is raised away from the drum by engagement of the fingers with the members 12, the cam surfaces 40 on the latch bear against edges of the opening 43, the springs 45 urging the latches outwardly against said edges, until the bar is raised a sufficient distance to allow the lugs 38 and the seats 39 to slip outwardly into the milled seats 56 and 57 on the underside of the bar. In this position, when the bar is released from the grip with the fingers, it is held in spaced relation to the drum. This position is best shown in Fig. 3 where the latch 34 is shown holding one edge of the bar away from the drum and wherein one set of latches has been released to allow the bar to drop onto the film or picture edge.

A sheet of film or paper may then be inserted under either edge of the bar. It is shoved under the bar which is now in spaced relation to the drum until the edge of the paper engages the cam surfaces 40 of the latches, and pushes the latches against the pressure of the spring 45 out of locking engagement with the underside of the bar. The springs 17 then draw the edge of the bar down onto the top of the paper, and the paper is engaged between the bight of the rib 8 and the exterior drum surface, and is securely held on the surface of the drum. The drum is then rotated one revolution so that the paper is wrapped around the drum and the other edge of the paper is then inserted under the other side of the bar where it engages the other latches which are holding up the other edge of the bar, as best shown in Fig. 3, and causes the same to be released. In the event that the paper or film is not of sufficient length to engage and release the latches, the paper may be inserted under the bar between the bar and the drum, and the latches released by engaging the ends which extend through the openings in the top of the bar with the fingers.

It will thus be seen that the operation of attaching a picture or a piece of film to the drum is relatively simple comprising merely raising the clamping bar to a position where it is locked by the latches, inserting one edge of the film underneath the bar where it disengages the latches and allows the edge to be clamped, then wrapping the picture around the drum, and inserting the other edge or end of the paper beneath the other side of the bar where it engages the other latches to lower the other side of the bar onto the film. In case the film or paper does not contact the other latches, they may be disengaged from locking position by the fingers. No special tools are provided either to raise the bar; lock the bar in position; or release the bar; and the attachment of the paper to the drum can be accomplished quickly, easily and without the necessity of being able to view the parts in order to so attach the paper.

The mechanism is relatively simple, economical of construction, and easy to manufacture.

Obviously, certain mechanical changes will be apparent to those versed in the art, but without departing from the principle or spirit of the invention as disclosed. It is, therefore, not my purpose to limit the invention to the precise construction shown, since the construction shown is merely exemplary of one convenient form that the invention may take.

I claim:

1. In combination with a telephoto receiver or transmitter, a drum, means for holding a sheet of material on the drum comprising a bar extending longitudinally of the drum, means for resiliently connecting said bar to the drum, and means for holding the bar away from the drum and releasable by said sheet of material to cause the bar to descend and clamp the material to the drum when the edge of the sheet is inserted under the bar.

2. In a clamp for securing a sheet of material to the drum of a telephoto machine, the combination of a drum, a clamp, spring means holding the clamp on the drum, latch means engageable with the clamp to hold the clamp in spaced relation to the drum when the clamp is raised from the drum, said latch means arranged to be disengaged from the clamp by the material when the material is interposed between the drum and the clamp.

3. In combination with a telephoto receiver or transmitter, a drum, a clamping bar extending longitudinally of the drum for holding a sheet of material on the drum, means for holding the bar toward the surface of the drum, latch means to hold the bar in spaced relation from the drum and releasable to allow the bar to contact the drum, spring means for the latches for holding them in latching engagement with the bar, said latches adapted to be engaged by the edge of the material to release the latches from locking engagement with the bar.

4. In combination with a telephoto receiver or transmitter, a drum, a clamping bar extending longitudinally of the drum for holding a sheet of material on the drum, means for holding the bar toward the surface of the drum, latch means to hold the bar in spaced relation from the drum and releasable to allow the bar to contact the drum, spring means for the latches for holding them in latching engagement with the bar, said latches being disposed in the path of the material which is to be gripped by the bar, and said material adapted to contact said latches to release them from holding engagement with the bar.

5. In a device of the class described, a cylindrical drum, and flanges for the drum, notches formed in said end flanges, a clamping bar normally seated on the surface of the drum and extending longitudinally on the drum, the ends of the bar extending through said notches and overhanging the ends of the drum, resilient means for holding the bar against the surface of the drum arranged to allow the bar to be moved away from the drum, latch means to hold the bar away from the drum and releasable to allow the bar to contact the drum, said latch means extending through openings in the bar and having abutments engaging the underside of the bar of the spring means for the latches for holding them in latching engagement with the bar, the edge of the material being engageable with said latches to release the latches from a locking engagement with the bar and cause said springs to pull said bar into contact with the material, which material is engaged between said bar and the drum, said latches having extensions adapted for manual engagement to release the same from locking engagement with the bar.

6. In combination with a drum for a picture transmitter or receiver said drum adapted for rotating a sheet of material such as a picture or a film, clamping means for said sheet material comprising a bar extending longitudinally along the drum and having ribs for engaging the surface of the sheet material near the edge, means to cause said bar to grip the material between the bar and drum comprising spring means connected to the drum and bar, said bar being capable of being raised away from the drum, means for holding said bar in spaced relation from the drum comprising latches pivotally carried by the drum and extending into engagement with the bar, said latches being positioned for contact by the edge of said sheet material and be released thereby from holding engagement with the bar when the sheet of material is inserted under the bar, said latches having extensions projecting beyond the upper surface of the bar for manually releasing the bar.

7. In an apparatus of the class described, a combination of a cylindrical drum, end-bells for supporting said drum and formed to provide guide notches therein, a clamping bar extending longitudinally of the drum and guided in said notches, said end-bells being formed with parallel channels communicating with said notches, spring means secured in said channels and connected to said bar for holding the bar against the surface of the drum, means to hold said bar in spaced relation from the drum comprising sets of latches each of the set of latches adapted to hold up one side of the bar and allow freedom of movement of the other side of the bar, brackets disposed interiorly of the drum for supporting said latches, spring means connected to the brackets and latches for urging the latches into locking engagement with the bar, said bar and drum being formed with aligned apparatus through which said latches may extend, said latches being adapted for disengagement by the edge of a sheet of material inserted under the bar and being provided with extensions extending above the bar adapted for engagement with the fingers for releasing said latches.

8. In an apparatus of the class described, a combination of a cylindrical drum, end-bells for supporting said drum and formed to provide guide notches therein, a clamping bar extending longitudinally of the drum and guided in said notches, spring means carried by said end-bells and connected to said bar for holding the bar against the surface of the drum, means to hold said bar in spaced relation from the drum comprising sets of latches each set of latches adapted to hold up one side of the bar and allow freedom of movement of the other side of the bar, brackets carried by the drum for supporting said latches, spring means connected to the brackets and latches for urging the latches into locking engagement with the bar, said bar and drum being formed with aligned apparatus through which said latches may extend, said latches being adapted for disengagement with the bar by the edge of a sheet of material inserted under the bar and being provided with extensions extending above the bar adapted for engagement with the fingers for releasing said latches.

LOUIS A. THOMPSON.